UNITED STATES PATENT OFFICE 2,595,636

STABILIZATION OF VINYLIDENE CHLORIDE RESINS

Cyril Alfred Brighton, Penarth, Wales, and Donald Faulkner, Epsom, England, assignors to The Distillers Company Limited, Edinburgh, Scotland, a British company No Drawing. Application January 4, 1949, Serial No. 69,246. In Great Britain January 13, 1948

6 Claims. (Cl. 260—45.8)

The present invention relates to the heat-stabilization of vinylidene chloride resins and, in particular, those which may be contaminated or admixed with iron or its compounds, by the incorporation of ester derivatives of aliphatic polyhydroxy acids.

It is known that vinylidene chloride resins containing as little as 0.01% iron deteriorate rapidly at 160° C., and that such contamination frequently arises in the manufacture and processing of these resins and during their recovery from scrap.

We have now found that polymeric resins comprising vinylidene chloride units may be stabilized by the incorporation of a neutral functionally aliphatic ester derivative of an aliphatic polyhydroxy acid, and this discovery is of particularly value in that it not only enables contaminated vinylidene chloride resins to be worked successfully but enables ordinary steel-containing equipment to be used in their manufacture and moulding or extrusion. The stabilizing effect is particularly noticeable with resins having at least 25% w./w. of vinylidene chloride units in their molecular structure, especially polyvinylidene chloride itself, and when at least 2% w./w. of the ester derivative is present. Generally, the incorporation of up to 10% w./w. of the ester in the resin is sufficient.

By neutral ester derivative of an aliphatic polyhydroxy acid is meant the type of compound derived from such an acid by the elimination of water between its carboxylic radicals and an alcoholic hydroxyl radical, and the latter may either be supplied by an auxiliary alcohol or it may be one of the hydroxyl radicals of the said polyhydroxy acid. In the case of polybasic acids, all the carboxyl radicals should be esterified.

When auxiliary alcohols are used it is preferred that these should be functionally aliphatic primary alcohols having from 1 to 8 carbon atoms, and acyclic alcohols, cyclic alcohols such as cyclohexanol and aryl substituted alcohols such as benzyl alcohol are suitable.

Suitable polyhydroxy aliphatic acids are the hydroxy derivatives of mono-basic and di-basic aliphatic acids containing at least 2 hydroxyl groups in the molecule (not including the hydroxyl group which may be considered to be part of the carboxyl group) and in which not more than 1 hydroxyl group is attached to any one carbon atom. Examples of suitable polyhydroxy acids are detailed as follows:

(1) Glyceric acid $CH_2OH.CH(OH).COOH$.— Esters of this acid may be prepared as described, for example, in J. C. S. 1930, page 1945.

(2) 3:4 dihydroxybutan-1-oic acid $$CH_2OH.CH(OH)CH_2COOH$$

This acid may be prepared by hydrolysis of the corresponding nitrile, obtained by the action of sodium or potassium cyanide on glycerol monochlorohydrin. The normal amyl ester of this acid was found to boil at 92–94° C. under 1 mm. Hg pressure.

(3) 2:3:4 trihydroxybutan-1-oic acid $$CH_2OH(CHOH)_2COOH$$

This acid may be synthesized from acrolein cyanhydrin as described in J. A. C. S. 1935, page 1406.

(4) Arabonic acid $CH_2OH(CHOH)_3COOH$.— This acid may be obtained by the oxidation of arabinose with bromine water, and stereoisomeric acids may be obtained similarly from other pentoses. The preparation of methyl arabonate has been described in Berichte, 1910, 43, page 1649.

(5) 4:5 dihydroxypentan-1-oic acid (dihydroxy-valeric acid)

$$CH_2OH.CHOH.CH_2CH_2.COOH$$

The butyl ester of this acid may be obtained by hydroxylation of the butyl ester of allyl-acetic acid by means of hydrogen peroxide in anhydrous formic acid according to the general method described in J. A. C. S., 1945, page 1786. The butyl dihydroxy-valerate so obtained boils at 128–9° C. under 1 mm. Hg pressure.

(6) Gluconic acid $CH_2OH(CHOH)_4COOH$.— The above acid is available commercially as its calcium salt, which may be converted to the ethyl ester of the acid, as described in J. A. C. S., 1915, page 257. Stereoisomeric acids may be prepared by oxidizing the corresponding hexoses by means of bromine water; for example, mannonic acid may be obtained from mannose.

(7) 9:10:12 trihydroxystearic acid $$CH_3(CH_2)_5CHOH.CH_2CHOH.CHOH(CH_2)_7COOH$$

This acid may be prepared by the oxidation of ricinoleic acid with a dilute aqueous potassium permanganate solution, according to the method described in J. A. C. S., 1937, page 690. Esterification of the acid with ethyl alcohol in the presence of paratoluene sulphonic acid as catalyst gave ethyl trihydroxy stearate, M. P. 90–92° C.

(8) Other hydroxy-stearic acids, being a mixture of di-, tetra- and hexahydroxy stearic acids, may be obtained by hydroxylation of a commercial grade of linseed oil fatty acids in a similar way. The product obtained melts in the range 92–106° C. and, on esterification with ethyl alcohol using hydrogen chloride as catalyst, gives a neutral mixture of ethyl esters melting in the range 85–88° C.

(9) Tartaric acid, HOOC.CHOH.CHOH.COOH.
(10) Trihydroxy glutaric acid,

HOOC(CHOH)$_3$COOH

Several acids having this constitution but differing in stereo-chemical configuration may be obtained by oxidation of the pentoses arabinose, ribose, lyxose and xylose.

(11) Tetrahydroxyadipic acid,

HOOC(CHOH)$_4$COOH

Of the many stereoisomers represented by this constitution, the commonest examples are saccharic and mucic acids, prepared by the oxidation of glucose and lactose respectively. Saccharic acid may be esterified by n-hexyl alcohol to give n-hexyl saccharate, a viscous oil. Esterification of mucic acid with n-butyl alcohol will give dibutyl mucate which crystallizes from butyl alcohol in small, colourless plates, melting at 130° C.

Any of the foregoing acids containing a hydroxyl group in the gamma or delta position to the carboxyl group are theoretically capable of forming lactones and lactides by the elimination of water. The following are examples of such compounds:

(12) Hydroxybutyrolactone

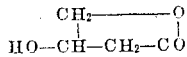

may be obtained as a colourless liquid, b. pt.₁ 114–118° C. by the lactonization of 3:4 dihydroxybutane-1-oic acid.

(13) Gluconic lactone,

was prepared from a commercial specimen of gluconic acid, which had become pasty, by trituration with alcohol and recrystallization of the resulting solid from alcohol to give the pure lactone, m. pt. 132–134° C.

Among the esters falling within the scope of this invention, butyl tartrate, ethyl trihydroxy stearate and butyl mucate have been found to be particularly effective.

The following examples illustrate the use of the novel stabilizing agents.

*Example 1*

A copolymer consisting of 80% w./w. of vinylidene chloride units and 20% of vinyl beta-methoxy-butyrate units which was contaminated by the presence of 50 p. p. m. of iron was plasticized by the addition of 10% w./w. of di(methyl-benzyl) ether. A sample of this copolymer was pressed in a nickel plated mould at 180° C. to give a disc, and this was found to be light brown in colour. Furthermore portions of the plasticized copolymer were then stabilized as follows:

(a) By incorporation of 5% w./w. of ethyl ester of hydroxylated linseed oil fatty acids.
(b) By the incorporation of 5% w./w. of gluconic lactone.
(c) By the incorporation of 5% w./w. of butyl tartrate.

On pressing these samples, the discs produced were of much lighter colour than the blank, and the stabilizers had good compatibility.

*Example 2*

A copolymer consisting of 95% w./w. of vinylidene chloride units, 2.5% w./w. of vinyl methyl ketone units and 2.5% acrylonitrile units, and contaminated by 44 p. p. m. of iron, was plasticized by the incorporation of 10% w./w. of distyrene and pressed in a nickel plated mould at 180° C. to give a disc which was very dark in colour; the addition of 5% w./w. of ethyl trihydroxy stearate to the plasticized copolymer considerably improved the colour of subsequent pressings and prevented any trace of decomposition.

*Example 3*

A copolymer consisting of 95% w./w. of vinylidene chloride units, 2.5% w./w. of acrylonitrile units and 2.5% of styrene units was found to be contaminated with 12 p. p. m. of iron. On plasticization with 10% w./w. of the dimer of alpha-methyl-styrene and pressing at 180° C. in a mould it gave a dark coloured disc which was opaque and which showed definite signs of decomposition. After the incorporation of 5% w./w. of di-butyl tartrate in the copolymer the pressing was repeated to give a disc which was only straw coloured and showed no signs of decomposition.

*Example 4*

A copolymer consisting of 86% w./w. of vinylidene chloride units, 12% w./w. of vinyl chloride units and 2% of iso-butene units was found to be contaminated with 24 p. p. m. of iron. It was plasticized by the addition of 10% w./w. of alpha-methyl-benzyl betacyanoethyl ether and the following pressings were carried out in a nickel plated mould at 180° C.

(a) Blank _____ Very dark with decomposition.
(b) With the addition of 10% w./w. of butyl glycerate_____ Straw coloured.
(c) With the addition of 10% w./w. of ethyl gluconate_____ Straw coloured.

*Example 5*

A resin sold under the trade name Saran B 115. containing a copolymer of vinyl and vinylidene chloride having a chlorine content of 69.7% together with about 10% by weight of di-(methyl-benzyl) ether was milled with 0.5% w./w. of iron and then extruded from a nickel extruder in which the nozzle was maintained at 170–175° C., to give a thread which was almost black and showed distinct signs of decomposition. The remainder of the copolymer was then stabilized as follows:

(a) With 2.5% w./w. of glucono-lactone.
(b) With 2.5% w./w. of butyl mucate.
(c) With 5% w./w. of butyl glycerate.
(d) With 5% w./w. of di-butyl tartrate.
(e) With 5% w./w. of hydroxy butyrolactone.
(f) With 5% w./w. of amyl dihydroxy butyrate.
(g) With 5% w./w. of hexyl saccharate.

These stabilized compositions were extruded in a similar manner and in each case the resulting thread had only the colour conferred by the iron oxide and showed no signs of decomposition.

We claim:

1. A resinous composition of matter comprising a polymeric resin having at least 25% by weight of vinylidene chloride units in its molecular structure, and a neutral, functionally aliphatic ester, containing at least two free hydroxy groups, of a polyhydroxy aliphatic acid in which not more than one hydroxyl group is attached to any one carbon atom, the said ester imparting to the composition stability to decomposition at elevated temperatures.

2. A resinous composition of matter as set forth in claim 1, wherein said ester is derived by elimination of water between the carboxyl and hydroxyl radicals of the polyhydroxy aliphatic acid.

3. A resinous composition of matter as set forth in claim 1, wherein said ester is derived by elimination of water between a carboxyl radical of the polyhydroxy aliphatic acid and the hydroxyl radical of a primary alcohol of 1 to 8 carbon atoms.

4. A resinous composition of matter comprising a polymeric resin having at least 25% by weight of vinylidene chloride units in its molecular structure and from 2% to 10% by weight thereof of di-butyl tartrate, the latter imparting to the composition stability to decomposition at elevated temperatures.

5. A resinous composition of matter comprising a polymeric resin having at least 25% by weight of vinylidene chloride units in its molecular structure and from 2% to 10% by weight thereof of ethyl trihydroxy stearate, the latter imparting to the composition stability to decomposition at elevated temperatures.

6. A resinous composition of matter comprising a polymeric resin having at least 25% by weight of vinylidene chloride units in its molecular structure, and a neutral, functionally aliphatic ester, containing at least two free hydroxy groups, of a polyhydroxy aliphatic acid in which not more than one hydroxyl group is attached to any one carbon atom, wherein said aliphatic ester is present in an amount of from 2% to 10% by weight of the composition, the said ester imparting to the latter stability to decomposition at elevated temperatures.

CYRIL ALFRED BRIGHTON.
DONALD FAULKNER.

REFERENCES CITED

The following references are of record in the file of this patent:

UNITED STATES PATENTS

| Number | Name | Date |
|---|---|---|
| 2,332,849 | Gruber et al. | Oct. 26, 1943 |
| 2,337,424 | Stoner et al. | Dec. 21, 1943 |